US006966592B2

(12) United States Patent
Harima et al.

(10) Patent No.: US 6,966,592 B2
(45) Date of Patent: Nov. 22, 2005

(54) RESIN-MADE FLOOR PANEL STRUCTURE

(75) Inventors: Issei Harima, Higashihiroshima (JP); Yoshihiro Takemoto, Higashihiroshima (JP); Takanobu Kamura, Aki-gun (JP); Chie Fukuhara, Aki-gun (JP); Takahiro Tochioka, Aki-gun (JP); Mitsuharu Kaneko, Aki-gun (JP); Fumiya Mouri, Aki-gun (JP)

(73) Assignees: G P Daikyo Corporation, Hiroshima (JP); Mazda Motor Corporation

( * ) Notice: Subject to any disclaimer, the term of this patent is extended or adjusted under 35 U.S.C. 154(b) by 0 days.

(21) Appl. No.: 10/829,402

(22) Filed: Apr. 22, 2004

(65) Prior Publication Data

US 2004/0262936 A1 Dec. 30, 2004

(30) Foreign Application Priority Data

Apr. 24, 2003 (JP) ............................ 2003-120244

(51) Int. Cl.[7] ................................................ B60N 3/12
(52) U.S. Cl. ................................ 296/37.2; 296/193.07
(58) Field of Search .......................... 296/37.2, 193.07; 224/42.12, 42.13, 42.14, 42.2, 42.24, 539, 224/541, 542

(56) References Cited

U.S. PATENT DOCUMENTS 5,421,633 A * 6/1995 Moore et al. .......... 296/193.07
5,860,687 A * 1/1999 Corporon et al. .......... 296/37.2
6,145,907 A 11/2000 Maruyama et al.
6,793,261 B2 * 9/2004 McLeod et al. ........... 296/37.2

FOREIGN PATENT DOCUMENTS

EP 0-333-267 A1 9/1989
EP 1-048-518 A1 11/2000
JP 2001-10542 1/2001

* cited by examiner

*Primary Examiner*—Lori L. Coletta
(74) *Attorney, Agent, or Firm*—Nixon Peabody LLP; Donald R. Studebaker

(57) ABSTRACT

The resin-made floor panel structure including a trunk floor F made of resin, and a trunk board B made of resin disposed so as to cover the trunk floor, a foamed layer having foams exposed at least in part is provided only on the side of the trunk board facing the floor panel. Thereby, in using resin materials for a floor panel, transmission of noise in the floor to the compartment side can be suppressed by a relatively simple structure without increasing the weight.

4 Claims, 4 Drawing Sheets

RESIN-MADE FLOOR PANEL STRUCTURE

BACKGROUND OF THE INVENTION

1. Field of the Invention

The present invention relates to a resin-made floor panel structure applied to a floor of vehicle such as automobile.

2. Description of the Related Art

As is well known, conventionally, the floors of vehicles such as automobiles have been constituted by using floor panels made of steel.

Recently, however, for a higher fuel cost efficiency, for example, the car body is expected to reduce in weight progressively. And, in order to meet such need, it is attempted to reduce the weight of the vehicle floor by using a floor panel made of resin. For example, Japanese Patent Laid-open Publication No. 2001-10542 discloses a manufacturing method of automobile floor by expansion molding.

By using a resin-made floor panel instead of steel plate structure, the weight of the vehicle floor is reduced, but the strength and rigidity are lowered at the same time, and further due to weight reduction of panel itself, the resonance point becomes higher, and problems of vibration and noise in the floor section become more serious, as a result silent compartment is disturbed.

To solve such problems, it may be considered to increase the thickness of the resin floor panel, but if the thickness is increased too much, the weight and the manufacturing cost are increased, and the merit of using resin for floor panel may be lost.

SUMMARY OF THE INVENTION

The invention is devised in the light of the above technical problems, and it is a basic object thereof to suppress transmission of noise generated in the floor section to the compartment side, without increasing the weight, in a relatively simple structure in a case of using a resin-made floor panel.

Therefore, in accordance with a first aspect of the present invention, there is provided a resin-made floor panel structure applied in a vehicle floor comprising: a floor panel made of resin, and a trunk board made of resin disposed so as to cover the floor panel, wherein a foamed layer having foams exposed at least in part is provided only on the side of the trunk board facing the floor panel.

According to the first aspect of the present invention, by the exposed foams of the foamed layer provided on the side of the trunk board facing the floor panel, the noise in the space between the floor panel and trunk board can be effectively absorbed. That is, by using resin materials for the floor panel, the weight is reduced, and the noise level can be lowered at a relatively low cost. In this case, the sound absorbing effect can be enhanced without having adverse effects on the strength, rigidity or appearance of the floor panel. Since the exposed foams are provided only on the side of the trunk board facing the floor panel, there is no adverse effect on the appearance at the compartment side of the trunk board.

Further, in accordance with a second aspect of the present invention, there is provided a resin-made floor panel structure applied in a vehicle floor comprising: a floor panel made of resin, and a trunk board made of resin disposed so as to cover the floor panel, wherein a foamed layer having foams exposed at least in part is provided on the side of the floor panel facing the trunk board.

According to the second aspect of the present invention, by the exposed foams of the foamed layer provided on the side of the floor panel facing the trunk board, the noise in the space between the floor panel and trunk board can be effectively absorbed. That is, by using resin materials for the floor panel, the weight is reduced, and the noise level can be lowered at a relatively low cost. In this case, the sound absorbing effect can be enhanced without having adverse effects on the strength, rigidity or appearance of the trunk board.

Furthermore, in accordance with a third aspect of the present invention, there is provided a resin-made floor panel structure applied in a vehicle floor comprising: a floor panel made of resin integrally forming a spare tire storage space, and a trunk board made of resin disposed so as to cover the floor panel, wherein rigidity of the floor panel is set so that the spare tire storage space may vibrate by priority when the floor panel vibrates, and a foamed layer having foams exposed at least in part is provided on the side of the spare tire storage space facing the trunk board.

According to the third aspect of the present invention, when the floor panel vibrates, the spare tire storage space is vibrated by priority, and noise is likely to be concentrated in this area, and further by the exposed foams of the foamed layer provided on the side of the spare tire storage space facing the trunk board, the noise in the space between the spare tire storage space and trunk board can be effectively absorbed. That is, by using resin materials for the floor panel, the weight is reduced, and the noise level can be lowered more effectively at a relatively low cost. In this case, the sound absorbing effect can be enhanced without having adverse effects on the strength, rigidity or appearance of the trunk board.

In one embodiment of the third aspect of the present invention, preferably, rigidity of the floor panel is set by forming beads at least in peripheral parts of the spare tire storage space.

In this case, in particular, the setting the rigidity of the floor panel that, when the floor panel vibrates, the spare tire storage space is vibrated by priority is achieved by forming beads at least in peripheral parts of the spare tire storage space. Thereby, at least peripheral parts of the spare tire storage space are reinforced, and the spare tire storage space is likely to vibrate relatively. That is, by a simple structure, the rigidity of the floor panel can be set.

Furthermore, in accordance with a fourth aspect of the present invention, there is provided a resin-made floor panel structure applied in a vehicle floor comprising: a floor panel made of resin integrally forming a spare tire storage space, and a trunk board made of resin disposed so as to cover the floor panel, wherein a foamed layer having foams exposed at least in part is provided only on the side of the trunk board facing the spare tire storage space, and a foamed layer having foams covered with a skin layer is provided on the side of the spare tire storage space facing the trunk board.

According to the fourth aspect of the present invention, by the exposed foams of the foamed layer provided on the side of the trunk board facing the spare tire storage space, the noise in the space between the spare tire storage space and trunk board can be effectively absorbed. That is, by using resin materials for the floor panel, the weight is reduced, and the noise level can be lowered at a relatively low cost. In this case, the foamed layer having the foams covered with a skin layer is provided on the side of the spare tire storage space facing the trunk board, and the sound absorbing effect can be enhanced while assuring the strength, rigidity or appearance of the spare tire storage space. Since the foamed layer having exposed foams is provided only on the side of the trunk board facing the floor panel, there is no adverse effect on the appearance at the compartment side of the trunk board.

In one embodiment of the present invention, preferably, the foamed layer with exposed foams has the foams exposed partly.

In this case, in particular, in the foamed layer with exposed foams, since the foams are exposed only in part, lowering of strength or rigidity of the panel material or board material having the foamed layer can be suppressed. That is, assurance of strength and rigidity of floor panel or trunk board and enhancement of sound absorbing performance can be established.

Further, in one embodiment of the present invention, preferably, the foamed layer with partly exposed foams includes exposed foams and foams covered with skin layer, which are combined depending on the frequency band determined as the object of attenuation.

In this case, in particular, in the foamed layer having the foams exposed in part, by combining the parts of exposed foams and parts of foams covered with skin layer appropriately depending on the frequency band determined as the object of attenuation, for example, the noise in particularly irritating specific frequency band can be attenuated effectively.

DETAILED DESCRIPTION OF THE INVENTION

A preferred embodiment of the invention is described below by referring to the accompanying drawings. The embodiment is to explain the present invention with an example in which it is applied to a floor panel structure of trunk disposed in a rear part of a car body of vehicle such as automobile, specifically.

Figure 1:
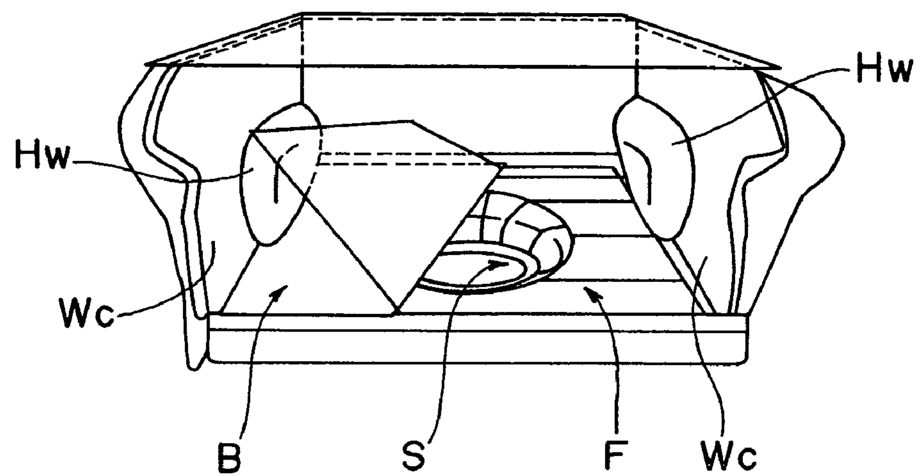
FIG. 1 is a schematic explanatory drawing of trunk of an automobile seen from behind the car body in a preferred embodiment of the invention.
Figure 2:
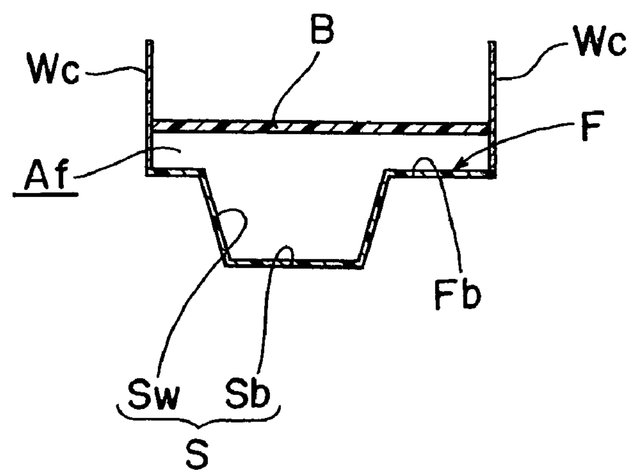
FIG. 2 is a sectional explanatory drawing schematically showing a basic configuration of floor structure of the trunk.

FIG. 1 is a schematic explanatory drawing of trunk of automobile seen from behind the car body in a preferred embodiment of the invention. FIG. 2 is a sectional explanatory drawing schematically showing a basic configuration of floor structure of the trunk.

As shown in the drawings, the trunk has a concave spare tire storage space S for accommodating a spare tire (not shown). The spare tire storage space S is formed in a floor panel F (trunk floor) constituting the floor. The trunk floor F is a one-body structure of synthetic resin material instead of a conventional steel plate structure.

Although not shown specifically in the drawings, both ends in the car width direction of the trunk floor F are supported by a pair of right and left frame members (rear side frames) extending in the longitudinal direction in the rear part of the car body. Front and rear ends of the trunk floor F are supported by a front frame and a rear end frame extending in the car width direction, respectively.

Above the trunk floor F, a trunk board B is disposed so as to cover the entire trunk floor F substantially. This trunk board B is also formed into one-body structure by using synthetic resin material.

In a relatively front side portion of right and left side walls Wc of the car body in the trunk, a pair of right and left wheel houses Hw are formed to cover the upper part of the right and left rear wheels (not shown).

The right and left side portions of the trunk board B preferably contact air-tightly with the right and left side walls Wc of the car body. Thereby, the air tightness of the space Af formed between the trunk board B and trunk floor F is heightened, and the noise such as road noise and tire noise from beneath the floor is absorbed as much as possible in the space Af, so that transmission of the noise to the compartment side is suppressed.

As the synthetic resin material for the trunk floor F and trunk board B, for example, a fiber reinforced plastic (FRP) material based on polypropylene (PP) resin may be used. Other usable resin materials include nylon, ABS, PPO, PBT, and other resin materials blending reinforcing materials, and various known materials. Reinforcing materials are not limited to glass fiber, carbon fiber, or other fiber reinforcing materials, but also include talc, glass beads, and other reinforcing materials.

The spare tire storage space S of the trunk floor F is, as known from FIG. 2, formed of a bottom part Sb for mounting a spare tire, and a peripheral wall part Sw rising from the peripheral edge of the bottom part Sb to a base surface Fb forming a flat reference plane of the trunk floor F.

Figure 3:
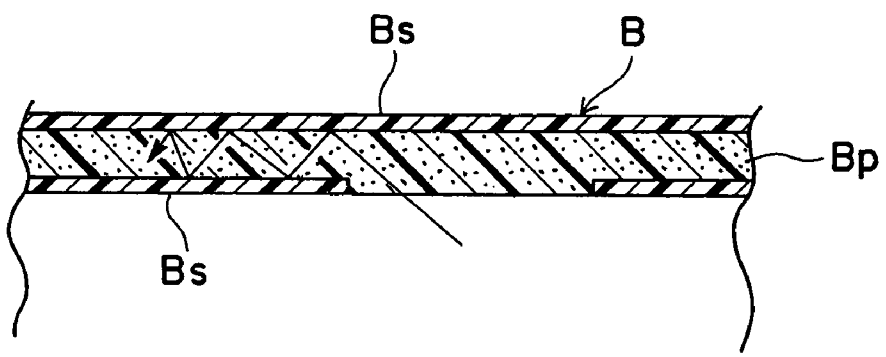
FIG. 3 is a sectional explanatory drawing schematically showing a sectional structure of trunk board of the trunk.

FIG. 3 is a sectional explanatory drawing schematically showing a sectional structure of the trunk board B.

As shown in the drawing, the trunk board B includes foamed layer Bp having multiple internal porous voids foams), and skin layers Bs covering the upper and lower surface sides of the foamed layer Bp.

The foamed layer Bp can be obtained, for example, by adding foaming agent in the material resin, and foaming at the time of molding and forming the foamed layer. Instead of using foaming agent, other methods may be employed, such as gas injection method or critical foaming method.

The skin layer Bs is formed as resin surface layer in the portion contacting the molding surface of the molding die, and it is a so-called solid layer solidified without having porous voids due to foaming.

In the preferred embodiment, only on the lower side of the trunk board B (that is, the side facing the trunk floor F), at least part of the surface layer Bs is removed, and the porous foams are exposed in this part.

Noise transmitted from beneath the trunk board B to the compartment side gets into the foamed layer Bp from the removed part of the solid skin layer Bs, and part of energy is directly absorbed by the porous foams Bp, so that the sound is absorbed very effectively.

If the entire surface is covered with the skin layer Bs without having exposed part of the foams Bp, noise transmitted from beneath the trunk board B to the compartment side may be partly absorbed when passing through the foamed layer Bp, but when at least part of the skin layer Bs is removed and at least part of the foamed layer Bp is exposed, sound propagation energy is directly absorbed in the foamed layer Bp, and a higher sound absorbing effect is obtained.

At least part of the skin layer Bs can be removed by various methods, and, for example, after forming the trunk board B, part of the skin layer Bs can be removed mechanically by using a cutting tool or the like, and the foams Bp can be exposed in this part.

Thus, by disposing the foamed layer Bp with exposed foams at least in part only on the side of the trunk board B facing the trunk floor F, the noise in the space Af between the trunk floor F and trunk board B can be effectively absorbed by the exposed foams Bp. That is, by using resin materials for the trunk floor F, the weight is reduced, and the noise level can be also lowered by a relatively low cost.

In this case, the sound absorbing effect can be enhanced without causing adverse effects on the strength, rigidity or appearance of the trunk floor F supporting a spare tire which is a heavy object. Since the exposed foams are provided only on the side of the trunk board B facing the trunk floor F, the compartment side of the trunk board B is free from adverse effects such as deposit of dust particles on the exposed part to impair the appearance.

In particular, in the foamed layer Bp with exposed foams, since the foams are exposed only partly, lowering of strength and rigidity of the trunk board B having such foamed layer can be suppressed. That is, both assurance of strength and rigidity of the trunk board B and enhancement of sound absorbing performance can be established.

In this case, meanwhile, in the foamed layer Bp with partly exposed foams, more preferably, portions of exposed foams and portions of foams covered with the skin layer Bs are properly combined, and it can be set to attenuate effectively the noise in specific frequency band, for example, noise in particularly irritating specific frequency band. That is, by combining depending on the frequency band determined as the object of attenuation, noise in particularly irritating specific frequency band can be attenuated effectively.

Figure 4:
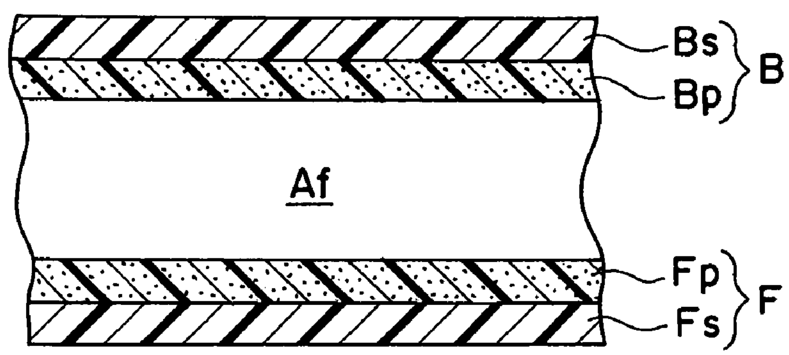
FIG. 4 is a sectional explanatory drawing schematically showing an example of combined state of trunk board and trunk floor.

FIG. 4 is a sectional explanatory drawing schematically showing an example of combined state of trunk board B and trunk floor F.

In this example, on both side of the trunk board B facing the trunk floor F (lower side) and side of the trunk floor F facing the trunk board B (upper side), the skin layers Bs, Fs are entirely removed, and the foamed layers Bp, Fp are entirely exposed. Therefore, the noise in the space Af formed between the two is very effectively absorbed, and transmission to the compartment side is suppressed.

Alternatively, on the side of the trunk floor F facing the trunk board B (upper side), the foamed layer Fp with foams exposed at least in part (entire surface in the example in FIG. 4) may be provided. In this case, by the foams exposed in the space Af formed between the floor panel F and trunk board B, the noise in the space Af can be more effectively absorbed. In particular, in this case, the sound absorbing effect can be enhanced without causing adverse effects on the strength, rigidity or appearance of the trunk board B.

When absorbing sound in a space, the sound energy density is higher as the space volume is smaller, so that the sound can be absorbed and attenuated more effectively. It is more advantageous when the air tightness of the space is higher.

Therefore, by closing the spare tire storage space S formed in the trunk floor F by the trunk board B, for example, the noise in the spare tire storage space S of relatively small space volume (as compared with the space Af) can be absorbed effectively.

Figure 5:
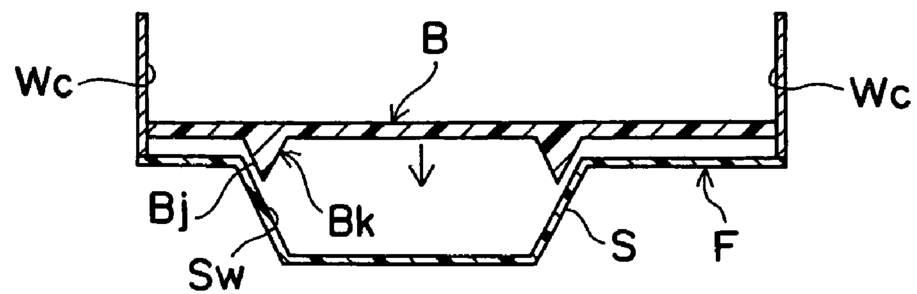
FIG. 5 is a sectional explanatory drawing schematically showing an example of structure of closure of spare tire storage space formed in the trunk floor by trunk board.
Figure 6:
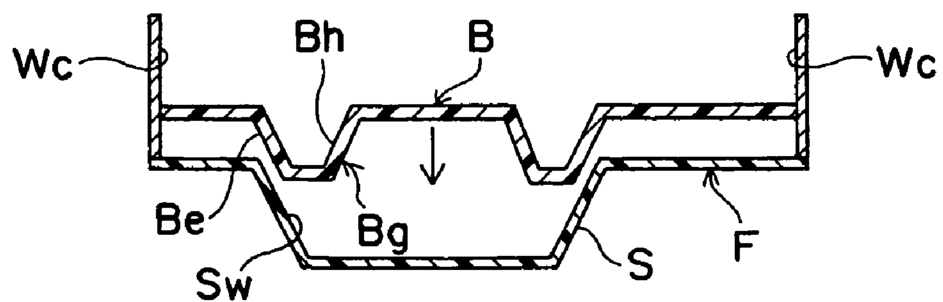
FIG. 6 is a sectional explanatory drawing schematically showing another example of structure of closure of spare tire storage space by trunk board.

FIG. 5 and FIG. 6 are sectional explanatory drawings schematically showing examples of structure of closure of spare tire storage space S.

In the example shown in FIG. 5, an annular protrusion Bk having a taper Bj is provided in the trunk board B, and the taper Bj of the protrusion Bk is fitted into the inner side of the tapered peripheral wall Sw of the spare tire storage space S, so that the spare tire storage space S is closed by the trunk board B. The taper Bj of the protrusion Bk and the inner side of the peripheral wall Sw fitting thereto are preferred to be both covered with a skin layer Bs.

In the example shown in FIG. 6, an annular protrusion Bg having a taper Be is provided in the trunk board B, and the taper Be of the protrusion Bg is fitted into the inner side of the tapered peripheral wall Sw of the spare tire storage space S, so that the spare tire storage space S is closed by the trunk board B. In this case, a recess Bh is formed at the upper side of the protrusion Bg, and this recess Bh can be used as a commodity pocket. The taper Be of the protrusion Bg and the inner side of the peripheral wall Sw fitting thereto are preferred to be both covered with a skin layer Bs.

Thus, in the structure of closing the spare tire storage space S by the trunk board B, only on the side of the trunk board B facing the spare tire storage space S, the foamed layer Bp with the foams exposed in part is provided, and on the side of the spare tire storage space S facing the trunk board B, preferably, the foamed layer Fp having the foams covered with the skin layer Fs is provided.

That is, in this case, by the exposed foams of the foamed layer Bp provided on the side of the trunk board B facing the spare tire storage space S, the noise in the space between the spare tire storage space S and trunk board B can be absorbed more effectively. That is, by using resin materials for the trunk floor F, the weight is reduced, and the noise level is lowered at a relatively low cost.

In this case, moreover, on the side of the spare tire storage space S facing the trunk board B, there is a foamed layer Fs having the foams covered with a skin layer Fs, and the sound absorbing effect is enhanced while assuring the strength, rigidity and appearance of the spare tire storage space S. Since the foamed layer Bp with exposed foams is provided only on the side of the trunk board B facing the trunk floor F, adverse effects on the appearance at the compartment side of the trunk board B can be avoided.

To absorb the noise in the space between the spare tire storage space S and trunk board B more effectively, the rigidity of the trunk floor F is set so that the spare tire storage space S may vibrate by priority when the trunk floor F vibrates, and it is more effective to dispose the foamed layer Bp with foams exposed at least in part, on the side of the spare tire storage space S facing the trunk board B.

That is, when the trunk floor F vibrates, the spare tire storage space S is vibrated by priority, and the noise can be easily concentrated in this area. And, by the exposed foams of the foamed layer Fp provided on the side of the spare tire storage space S facing the trunk board B, the noise in the space between the spare tire storage space S and trunk board B can be absorbed more effectively.

Such setting of rigidity of the trunk floor F can be achieved by forming beads at least in the peripheral parts of the spare tire storage space S.

That is, by forming beads at least in the peripheral parts of the spare tire storage space S, these parts are reinforced by a simple structure, and the rigidity of the trunk floor F can be set so that the spare tire storage space S may be likely to vibrates relatively.

In the above mentioned case, at the side of the plate member having the foamed layer with partly exposed foams (the trunk board B or trunk floor F), parts with exposed foams and parts of foams covered with skin layer are properly combined, and set so as to attenuate effectively the noise in specific frequency band, that is, noise in particularly irritating specific frequency band.

Such setting can be determined relatively easily and securely by means of insert molding by properly combining, for example, sound absorbing material or sound insulating material as insert material.

Figure 7:
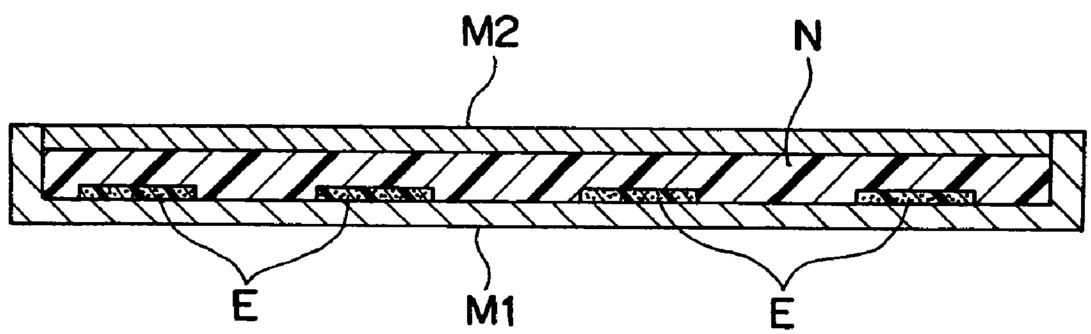
FIG. 7 is a sectional explanatory drawing schematically showing an example of insert molding by using sound absorbing material as insert material.
Figure 8:
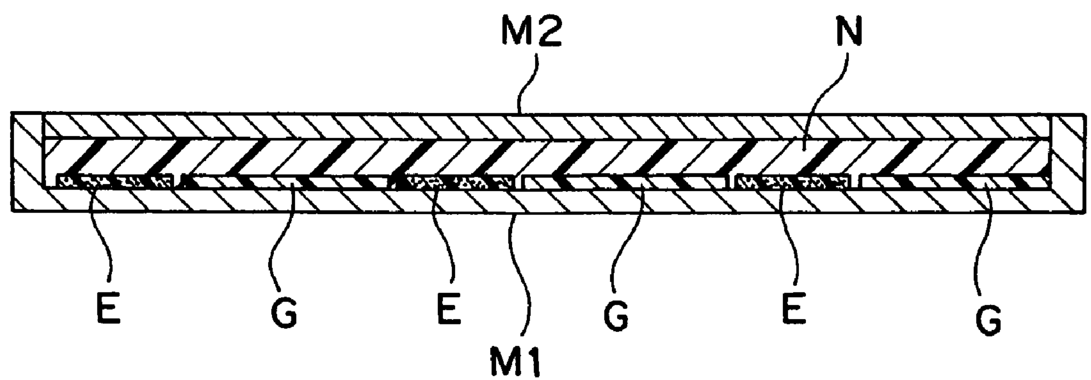
FIG. 8 is a sectional explanatory drawing schematically showing an example of insert molding by using sound absorbing material and sound insulating material as insert materials.

FIG. 7 and FIG. 8 are sectional explanatory drawings schematically showing examples of insert molding.

In the example shown in FIG. 7, sound absorbing materials E of specified shape and area are inserted and fixed at specified position of a molding die M1, and a molding die M2 is closed by fitting into molding die M1. And, thereafter, the molding cavity formed by the molding die M1, M2 is filled with material resin N for molding. Thereby, a molded member having sound absorbing materials E of specified shape and area at a specified position of one specified side is obtained.

In this case, the surface area of the portion other than the sound absorbing materials E is formed of a skin layer of solidified material resin, and the sound absorbing effect is obtained by the sound absorbing materials E at specified position, while a sound insulating effect is obtained by the skin layer in other region.

By properly combining such sound absorbing materials E and skin layer, for example, noise in particularly irritating specific frequency band can be attenuated effectively.

In the example shown in FIG. 8, sound absorbing materials E of specified shape and area are inserted and fixed at specified position of a molding die M1, while sound insulating sheets G are inserted and fixed in other region, and a molding die M2 is closed by fitting into molding die M1. And, thereafter, the molding cavity formed by the molding die M1, M2 is filled with material resin N for molding. Thereby, a molded member having sound absorbing materials E of specified shape and area at a specified position, with other region covered with sound insulating sheets G on one specified side is obtained.

In this case, the sound absorbing effect is obtained by the sound absorbing materials E at specified position, while a high sound insulating effect is obtained by the sound insulating materials G in other region.

By properly combining such sound absorbing materials E and sound insulating sheets G, for example, noise in particularly irritating specific frequency band can be attenuated effectively.

Examples of the sound absorbing material E include nonwoven cloth, felt layer, foamed or unfoamed urethane layer, nylon resin carpet layer, and other sound absorbing materials. Examples of sound insulating sheet G include synthetic resin sheet of a certain hardness having sound insulating property, and others.

The invention is not limited to the illustrated preferred embodiments alone, but may be changed or modified in the design within a scope not departing from its true spirit.

What is claimed is:

1. A resin-made floor panel structure applied in a vehicle floor comprising:

a floor panel made of resin, and a trunk board made of resin disposed so as to cover the floor panel, wherein a foamed layer having foams exposed at least in part is provided only on the side of the trunk board facing the floor panel, and the foamed layer with partly exposed foams includes exposed portions of which the foams are exposed to the side facing the floor panel and covered portion of which the foams are covered with skin layers on the side facing the floor panel, and the exposed portions and the covered portions are combined depending on a frequency band determined as an object of attenuation.

2. A resin-made floor panel structure applied in a vehicle floor comprising a floor panel made of resin, and a trunk board made of resin disposed so as to cover the floor panel, wherein a foamed layer having foams exposed at least in part is provided on the side of the floor panel facing the trunk board, and the foamed layer with partly exposed foams includes exposed portions of which the foams are exposed to the side facing the floor panel and covered portions of which the foams are covered with skin layers on the side facing the floor panel, and the exposed portions and the covered portions are combined depending on a frequency band determined as an object of attenuation.

3. A resin-made floor panel structure applied in a vehicle floor comprising:

a floor panel made of resin integrally forming a spare tire storage space, and a trunk board made of resin disposed so as to cover the floor panel, wherein rigidity of the floor panel is set so that the spare tire storage space may vibrate by priority, when the floor panel vibrates, a foamed layer having foams exposed at least in part is provided on the side of the spare tire storage space facing the trunk board, and the foamed layer with partly exposed foams includes exposed portions of which the foams are exposed to the side facing the trunk board and covered portions of which the foams are covered with skin layers on the side facing the trunk board, and the exposed portions and the covered portions are combined depending on a frequency band determined as an object of attenuation.

4. A resin-made floor panel structure applied in a vehicle floor comprising:

a floor panel made of resin integrally forming a spare tire storage space, and a trunk board made of resin disposed so as to cover the floor panel, wherein a foamed layer having foams exposed at least in part is provided only on the side of the trunk board facing the spare tire storage space, a foamed layer having foams covered with a skin layer is provided on the side of the spare tire storage space facing the trunk board, and the foamed layer with partly exposed foams includes exposed portions of which the foams are exposed to the side facing the trunk board and covered portions of which the foams are covered with skin layers on the side facing the trunk board, and the exposed portions and the covered portions are combined depending on a frequency band determined as an object of attenuation.

* * * * *